(12) United States Patent
Taboada

(10) Patent No.: US 7,200,488 B2
(45) Date of Patent: Apr. 3, 2007

(54) DEVICE FOR AUTOMATED FISHING INFORMATION ACQUISTION

(76) Inventor: Keith Taboada, 1005 Sunset Dr., Brielle, NJ (US) 08730

(*) Notice: Subject to any disclaimer, the term of this patent is extended or adjusted under 35 U.S.C. 154(b) by 377 days.

(21) Appl. No.: 10/822,012

(22) Filed: Apr. 9, 2004

(65) Prior Publication Data

US 2005/0228581 A1  Oct. 13, 2005

(51) Int. Cl.
*G01C 21/00* (2006.01)
(52) U.S. Cl. .................. 701/200; 701/35; 701/208; 342/357.09; 43/4; 43/4.5
(58) Field of Classification Search ............... 701/200, 701/201, 207, 208, 212, 223, 300, 35; 342/357.01, 342/357.08, 357.09; 43/4, 4.5; 707/200
See application file for complete search history.

(56) References Cited

U.S. PATENT DOCUMENTS

| 2002/0032696 A1* | 3/2002 | Takiguchi et al. ....... 707/500.1 |
| 2003/0056419 A1* | 3/2003 | Squires et al. ................ 43/4.5 |
| 2004/0054821 A1* | 3/2004 | Warren et al. ................. 710/8 |

* cited by examiner

*Primary Examiner*—Gertrude A. Jeanglaude
(74) *Attorney, Agent, or Firm*—Keith Taboada

(57) ABSTRACT

Generally, a method and apparatus for the automated acquisition of information related to fishing is provided. In one embodiment, a data acquisition system is provided comprising a memory, a processor coupled to the memory, a communication port for coupling to a vessel navigation system and a switch, which when actuated, causes information retrieved from the vessel navigation system to be stored in memory. The information, which includes attributes associated with the event, may be recall for viewing and analysis. The information may also be exported from the data acquisition system to a remotely stored database.

20 Claims, 3 Drawing Sheets

| Event No. | Date | Time | Latitude | Longitude | Heading | Speed | Depth | Water Temperature | ... | Species |
|---|---|---|---|---|---|---|---|---|---|---|
| 1 | 3/27/99 | 13:42 | 393283 | 722246 | 330 | 4.2 | 186 | 69.7 | | Yellowfin |
| 2 | 3/27/99 | 15:20 | 393284 | 722201 | 014 | 5.3 | 195 | 69.5 | | Yellowfin |
| 3 | | | | | | | | | | |

FIG. 2

DEVICE FOR AUTOMATED FISHING INFORMATION ACQUISTION

BACKGROUND OF THE DISCLOSURE

1. Field of the Invention

Embodiments of the invention generally relate to a method and apparatus for automated gathering of fishing data.

2. Background of the Invention

Fishermen generally rely on handwritten logs to track historical catch information. These logs typically include at least the time and place that catches are made. It is believed that spreadsheet software is available to allow the construction of a database of information from information manually entered from the fisherman's log.

A problem associated in maintaining a handwritten log is that is difficult to enter information accurately. For example, log entries are often made well after a fish is landed, and the information pertaining to the catch must be correctly recalled from a person's memory. Moreover, if fishing is fast (e.g., many or multiple fish are being caught), entering catch information is often forgotten until the action slows, in which time the position and other relevant information may be significantly different than when the action first started. Additionally, move information is generally available then is convenient to log, and therefore, pertinent information is often not recorded.

Therefore, it would be advantageous to automate data acquisition in order to readily obtain and build a reliable fishing database.

SUMMARY OF THE INVENTION

Generally, a method and apparatus for the automated acquisition of information related to fishing is provided. In one embodiment, a data acquisition system is provided comprising a memory, a processor coupled to the memory, a communication port for coupling to a vessel navigation system and a switch, which when actuated, causes information retrieved from the vessel navigation system to be stored in memory. The information, which includes attributes associated with the event, may be recall for viewing and analysis. The information may also be exported from the data acquisition system to a remotely stored database.

BRIEF DESCRIPTION OF THE DRAWINGS

The teachings of the present invention can be readily understood by considering the following detailed description in conjunction with the accompanying drawings, in which:

FIG. 2 is a spreadsheet depicting one embodiment of a display of the automated information logging device of FIG. 1.

To facilitate understanding, identical reference numerals have been used, where possible, to designate identical elements that are common to the figures.

DETAILED DESCRIPTION

Embodiments of the invention generally provide a method and apparatus for the automated acquisition of information related to fishing. The information is stored and available for retrieval so that historical information may be utilized to plan future fishing trips and/or improve the success of a current trip. It is contemplated that some information may require manual entry, however, as the bulk of the information is harvested automatically, the operator interaction is minimized, thereby allowing more efficient, complete and accurate data acquisition.

Figure 1:
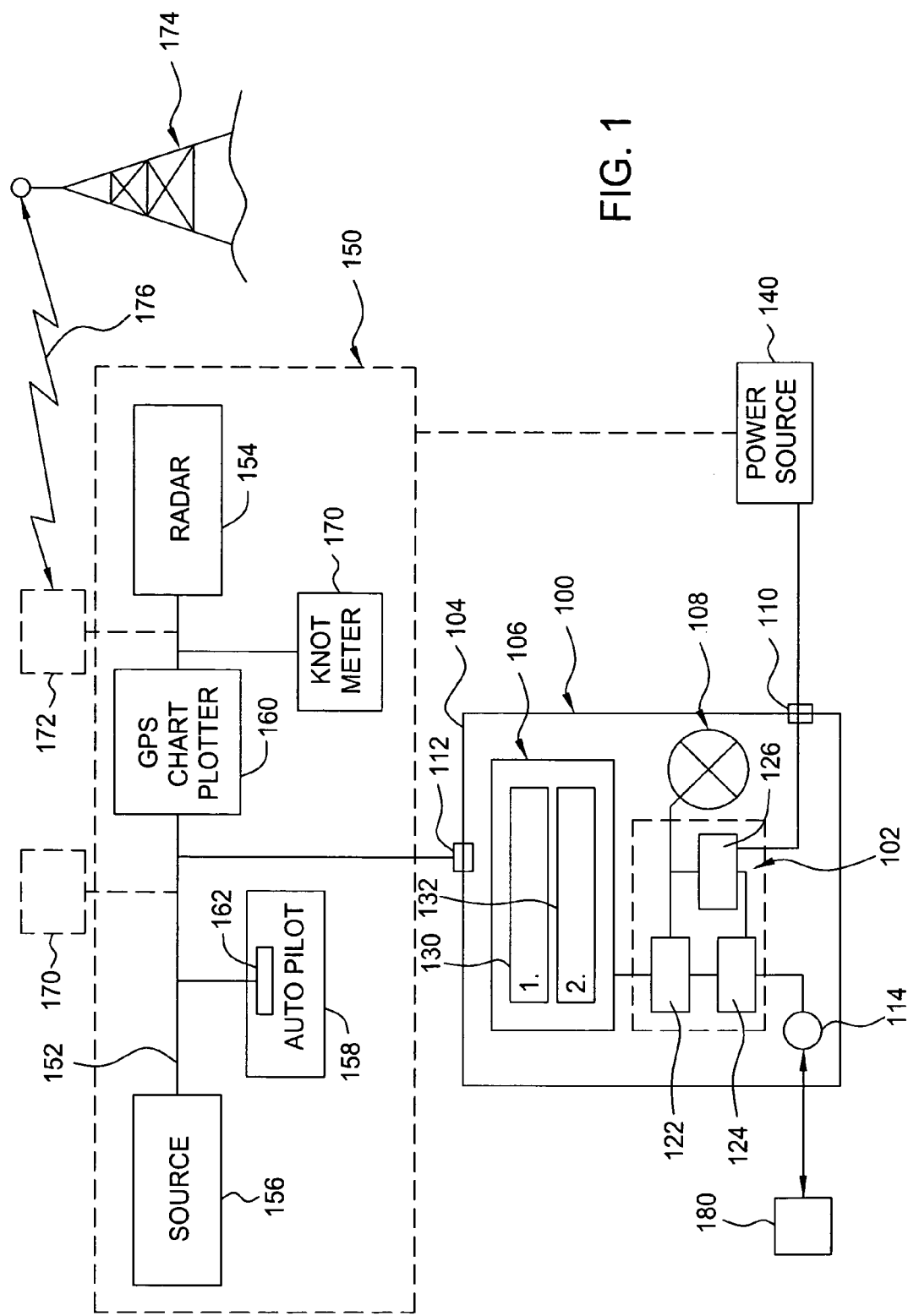
FIG. 1 is a schematic block diagram of one embodiment of an automated information logging device.

FIG. 1 is a block diagram of one embodiment of a fishing data acquisition system 100, hereinafter referred to as logger 100. The logger 100 is generally coupled to or part of a vessel navigation system 150. The logger 100 generally stores, in response to a signal indicative of an event, information associated with the event. In one example, a signal is generated in response to catching a fish (or other related event) and information such as the date, time, place, water temperature and the like, is stored to create a historical database of the event. Most of the invention is readily available from the vessel navigation system 150 thereby facilitating data acquisition with minimal operation interface. The historical database may be utilized during the current trip and/or to plan future fishing trips. For example, the information may be utilized to return to a school of fish, a favorable water temperature break, a trolling speed and the like.

It is contemplated that one of the components of the vessel navigation system 150 discussed below may be modified to incorporate the logger 100 as a single unit. It is also contemplated that the logger 100 may be a lap top computer, a personal digital assistant, a ship board computer or the like, configured to communicate with the vessel navigation system 150.

Typical vessel navigation systems 150 may include a number of navigation and other components coupled on a network 152 so that information may be shared between components. In the embodiment depicted in FIG. 1, the vessel navigation system 150 includes a radar 154, a sounder 156, an autopilot 158 and a chart plotter 160. The network 152 allows information obtained by one component of the vessel navigation system 150 to be utilized and/or displayed on another component. For example, depth information obtained by the sounder 156 may be displayed on another component, such as the chart plotter 160. In another example, vessel position, available from the chart plotter 160 (or GPS, loran or other device) may be displayed on another component, such as the sounder 156. In another example, heading obtained by a bearing indicator 162 (or digital compass) within the autopilot 158 will allow radar information from the radar 154 to be overlaid on graphics displayed on the chart plotter 160. Examples of vessel navigation systems that may be adapted to benefit from the invention are available from FURUNO, RAYTHON, SIMARD and NORTHSTAR, among other marine navigation systems. It is contemplated that the vessel navigation system may be an "all in one unit", or a pc based system.

The logger 100 includes a controller 102 disposed a housing 104. The housing 104 is generally suitable for housing marine electronics. In one embodiment, the housing 104 includes a display 106, one or more function keys 108, a power connection 110, a first communication port 112 and a second communication port 114. The controller 102 manages data obtained by the logger 100. The controller 102 includes a central processing unit (CPU) 122, support circuits 126 and memory 124. The CPU 122 may be one of any form of computer processor that can be used in an marine instrument setting for managing data. The memory 124 is coupled to the CPU 122. The memory 124, or computerreadable medium, may be one or more of readily available memory such as random access memory (RAM), read only memory (ROM), floppy disk, hard disk, or any other form of digital storage. The support circuits 126 are coupled to the CPU 122 for supporting the processor in a conventional manner. These circuits include cache, power supplies, clock circuits, input/output circuitry, subsystems, and the like.

The display 106 is coupled to the controller 102. The display 106 may be a CRT, LCD or other type. During typical operation of the logger 100, the display 106 is configured to display at least one data line (two data lines 130, 132 are shown). The display 106 may display other functions or status of the logger 100 during other portions of the routine. The contents of each data line are further described below.

The one or more function keys 108 are positioned proximate the display 106 to allow an operator to scroll through the historical information stored in the memory 124, to set-up the logger's data acquisition routine and to manually enter information to memory 124. It is contemplated that the function keys 108 may be incorporated into the display 105 (i.e., a touch screen). In the embodiment depicted in FIG. 1, the function key 108 is a multi-function key that allows entries to be selected from a menu displayed on the display 106.

The power connection 110 is disposed in the housing 104 and couples the controller 102 to a power source 140. The power source 140 may be the vessels DC electrical power system. Alternatively, the logger 100 may include a rechargeable battery.

The first communication port 112 facilitates communication between the logger 100 and the vessel navigation system 150. In the embodiment depicted in FIG. 1, the first communication port 112 is an Ethernet connection that allows data to be transferred from the vessel navigation system 150 to the logger 100. It is contemplated that other ports or devices that facilitate the transfer of data from the vessel navigation system 150 to the logger 100 may be alternatively utilized, for example, wireless, radio, optical, land-line (e.g., telephone, cable or data line) or other suitable communication method may be utilized. It is also contemplated that the logger 100 may be configured to communicate with the vessel navigation system 150 via a communication protocol and/or connection proprietary to the manufacture of the vessel navigation system 150.

In operation, the logger 100, in response to a signal triggering data storage, records information taken from the vessel navigation system 150 to memory 124. The signal may be generated by manually actuating the function key 108 to start a data storage routine. Generally, the signal to start the data storage routine will be at least one of a fish strike, landing, sighting or as desired by the operator. It is contemplated that the signal to start the data storage routine may be automatically triggered, for example, by a torque or line sensor coupled to a fishing reel, a signal generated by a outrigger/flat line clip release and the like. It is also contemplated that the signal may be provided remotely to the logger 100 via a foot pedal or other switch located in the cockpit, tower or there location remote from the helm. Alternatively, the signal initiating the data storage routine may generated by a wireless remote.

The data storage routine generally includes storing at least one of the time and date of the triggering event, along with at least one entry indicative of fishing information. The fishing information is generally information available from the vessel navigation system 150 and recorded by the logger 100.

The recorded information may also include one or more of sea water temperature, vessel heading, vessel location (latitude and longitude, and/or LORAN position), depth and vessel speed. Time of the trigger signal may also be recorded. Date and time may be obtained from at least one of the vessel navigation system 150 or from the support circuits 112 of the controller 102 of the logger 100.

It is contemplated that one or more other instruments or sensors 170 may be coupled to the vessel navigation system 150 (or directly to the logger 100) and provide information to the available to the logger 100. Such for example, knotmeters, bearing indicators, salinity, sea water temperature sensors (surface and/or immersion), thermocline, wind direction, wind strength, barometric pressure sensors, among others, may be provide data to the logger 100. It is also contemplated that one or more receivers 172 may be coupled to the vessel navigation system 150 and provide information to the available to the logger 100. Such receivers 172 may be configured to receive a satellite, or wireless signal 176, such as transmitted from a shore based cell tower 174 (or satellite or other signal repeater, not shown). Information provided to the receiver 172 may include weather, sea surface temperature, salinity, lunar, current information, buoy sea/weather data information (available over the internet from NOAA), data files or other information. It is contemplated that the receiver 172 may be configured to access the internet via cable, telephone or data lines when the vessel is in port to transfer information to memory 124 of the logger 100 from another memory source. Alternatively, the logger 100 may be configured to accept data storage devices (such as a disk or flash memory) such that information may be loaded into the memory 124 of the logger 100. In yet another embodiment, information by be permanently loaded into the memory 124. For example, current and lunar information may be permanently stored in the memory 124 of the logger 100. It is also contemplated that information from one or more of the above may be manually keyed into the logger 100 or provided thereto from a PDA, disk or other file storage device.

The information stored by the logger 100 in response to the triggering event is generally displayed on the display 106. In the embodiment depicted in FIG. 1, the display 106 includes one or more data lines (two data lines 130, 132, are shown). Each date line 130, 132 include at least date and location information for the event.

The operator, using the function key 108, may scroll through the display 106 to view historical information. This will enable the helmsman of the vessel to return to a location of a prior event, for example, the place where the last fish was caught. In another example, the historical information associated with a prior catch or catches may be viewed to determine at least one of where, when, at what temperature, speed, salinity and the like, prior catches have been made to assist returning the vessel to a location where it is likely to encounter the same conditions, thus, increasing the likelihood of another catch.

Other information may be keyed into the logger 100 and added to the current or other data line stored in the memory 124. Keyed information may include the type of fish caught, the method used to catch the fish (i.e., troll, drift, jig, lure color, kite, down rigger depth and the like) or user defined information. Other information that may be keyed in may include percent sunshine, weedlines, baitfish presence and/or type, among others. The keyed information may be selected from a previously set up menu of choices. Alternatively, the function key 108 may allow alpha numeric entry.

FIG. 2 depicts one embodiment of the data lines 130, 132 displayed on the logger 100. It is contemplated that the fields (e.g., columns) of the data lines 130, 132 may be selected in a set-up routine, and that one or more of the fields may also be hidden form view (i.e., have data assigned to the field in memory, but not display the information). In the event that data for a given field is available from one or more sources, for example, speed via a knot meter and GPS unit of the vessel navigation system, the source of information to be stored in the field may be predetermine as part of the step-up routine.

Returning to FIG. 1, the second communication port 114 of the logger 100 is configured to allow transfer of data from the memory of the logger 100 to a remote device 180. For example, the logger 100 may transfer information from the memory 124 to the memory of a remote device 180. In the embodiment depicted in FIG. 1, the remote device 180 is a laptop, personal digital assistant (PDA), ship board computer, desk top computer and the like. The information transferred from the logger 100 to the remove device 180 be analyzed remotely, and/or added to a larger archive of historical fishing information. Some or all of the larger archive may be reloaded to the logger 100 or viewed on the remove device (or other computer). In one embodiment, a statistical software package that can do multi-variant analysis, design of experiments, and the like, can be utilized to analyze the conditions that exist when fish are caught (e.g., information from the logger 100), or any other desired outcome. The software can perform multi-variant analysis after a sufficient number of events have occurred (more events equals greater statistical accuracy) to determine whether any of the variables have an individual, or collective, effect on the likelihood of catching a fish. For example, the wind direction may not mean much by itself, but in combination with a particular location, time of day, water temperature, etc., there may be a multi-variable association with the likelihood of catching a fish. This would allow you to predict or optimize performance. This statistical analysis could never be perfect since the fish constantly are on the move and there are innumerable other factors involved, however, the analysis could be used to predict the "best likelihood" of an event. Such a software package could be configured to analyze the data culled from the database. In embodiments where the logger 100 has suitable memory, the logger 100, an analysis software or routine may be provided in the memory of the logger 100 to allow data analysis without downloading information to another device. Alternatively, analysis software or routine stored in a device remote from the logger 100 may be utilized to allow analysis of information downloaded from the logger 100.

In other embodiment, the logger 100 may be configured for commercial applications. For example, the logger 100 may receive and/or have data keyed in indicated of trawl by-catch, trawl direction or duration. By-catch information may be utilized to maximized harvest of a target species while avoiding area or techniques that result in undesirable amounts of by-catch. Alternatively, the information may be utilized to result in maximizing the potential distribution of species within a given trawl. Analyzing the data as discussed above advantageously allows for various factors to be processed allowing multi-variable effects on fishing outcomes to be determined, thereby allowing fisherman to optimize their fishing effects and/or reduce by-catch.

Figure 3:
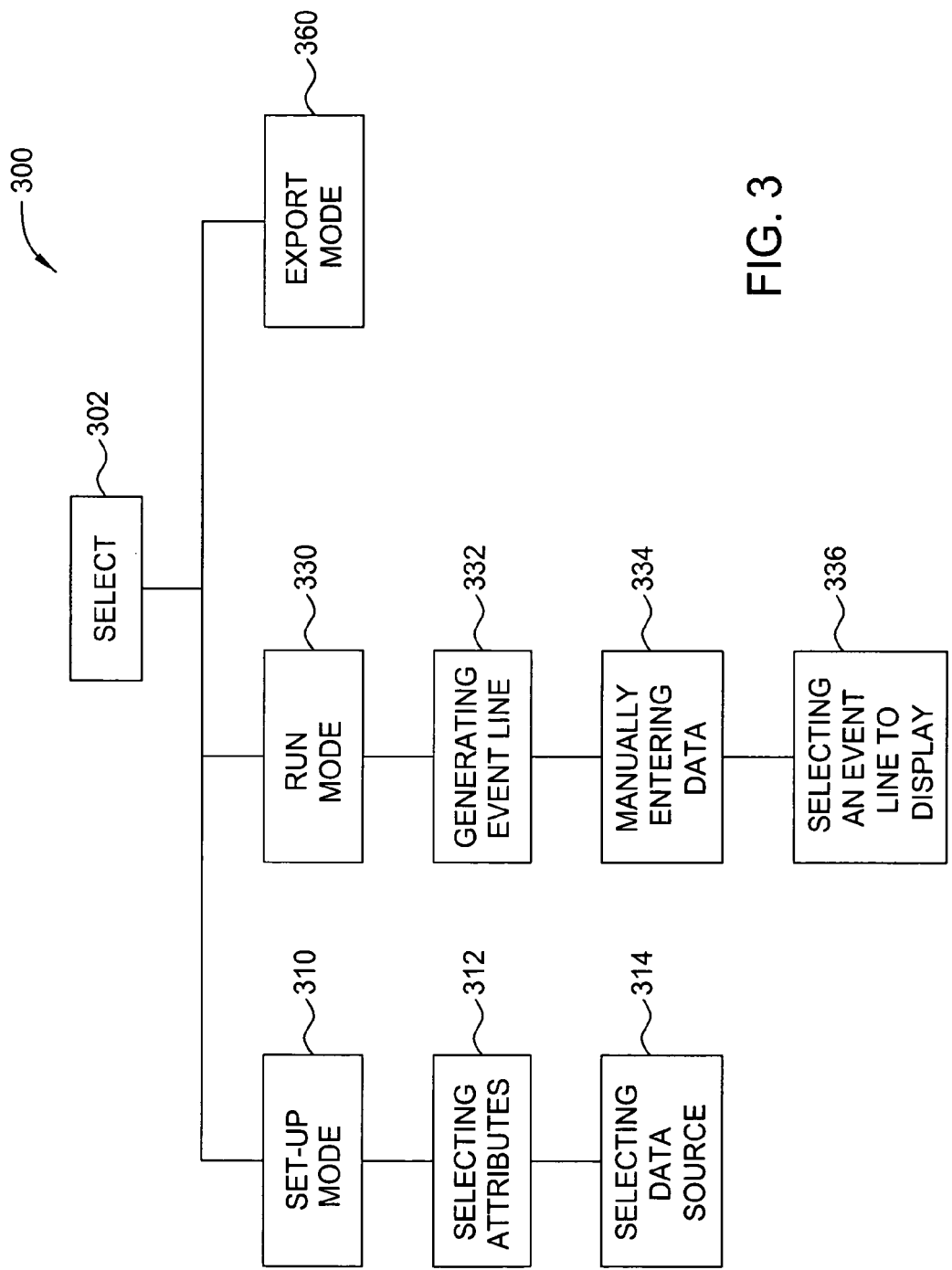
FIG. 3 is a flow diagram of one mode of operation of an automated information logging device.

FIG. 3 is a flow diagram of one mode of operation of the logger 100. Operation of the logger 100 begins at home step 300 by selecting between a set up mode 310, a run mode 330 and an export mode 360. The set up mode 310 can be selected at any time to set and/or change the operational parameters of the logger 100. The set up mode 310 includes a step 312 of selecting attributes to be recorded into memory 124 during the run mode 330. For example, any data available to the logger 100 may be selected at step 312 and assigned one of the columns $210_i$ in the data line 130 (shown in FIG. 2). If the data selected in step 312 is available from multiple sources, a source for the data is selected at step 314. Steps 312, 314 are repeated until all fields of the columns $210_i$ selected for display and recordation are identified by the operator. At step 316, the set up mode 310 is exited and the program returns to the home step 300.

The run mode 330 displays at least one text line (the text lines 130, 132 are shown in FIG. 1, additional text lines 202, 204, 206, 208 are shown in FIG. 2). Each event is associated with a unique text line (i.e., event number). The texts line 130,132 displayed in the embodiment depicted in FIG. 1 show the data stored for the last two events. In the run mode 330, the function key 108 allows for data stored for other events to be displayed by scrolling through the text lines. Upon receipt of a signal at step 332, a new event line is generated and the data fields associated with the columns $210_j$ are automatically populated with data available to the logger 100 from the vessel navigation system 150 and/or other sources as described above. For example, Date, Time, Latitude, Longitude, Heading, Speed, Depth and Water Temperature information are populated into fields associated with columns $210_{2-9}$ of text line 202 respectively from the support circuits 126 of the logger 100, the chart plotter 160, the knot meter sensor 170 and the sounder 156.

At set 334, information not automatically populating the text line may be manually entered using the function key 108. The manually entered text may be entered directly by keying in alpha-numeric information, and/or by using the function key 108 to select a data field and scroll through a predefined selection of choices available for that field. For example, a column $210_i$ associated with the label "Species" may have a menu available from which the operator may populate the field by scrolling through the menu and selecting a desired species from a table defined during the set up mode 310. Any event text line may be recalled and displayed using the multifunction key 108 at step 336.

At step 360, data stored in the memory 124 may be exported via the second communication port 114 to a remote device 180. In one embodiment, the data is transferred from the logger 100 to a PDA using an optical transmission. In another embodiment, data is transferred from the logger 100 to a remove device 180 such as a personal computer or lap top using a wireless transmission or fix communication lines. Once the data is transferred to a remote device 180, the data may be added to a data base file containing data from other events, thereby allowing review and analysis. As stated above, the analysis may by manual analysis, for examples, look through events taking place at common locations and/or dates, common fishing techniques, at common temperatures, sorting by species and the like. In another embodiment, the analysis may be assisted by computer analysis to identify trends and complex relationships between variables (data attributes, for example, water temperature and lunar phase).

Although embodiments which incorporate the teachings of the present invention have been shown and described in detail, those skilled in the art can readily devise many other varied embodiments that still incorporate these teachings.

What is claimed is:

1. A data acquisition system comprising:
a memory;
a processor coupled to the memory; and
a first communication port adapted for coupling to a vessel navigation system; and
a switch, when actuated in response to an event, causes information retrieved from the vessel navigation system to be stored in memory and be associated with data that includes by-catch information.

2. The data acquisition system of claim 1 further comprising a display, wherein the display displays at least one entry line having at least a date and a position associated with the event.

3. The data acquisition system of claim 1 further comprises at least one of a sounder, a radar or a chart plotter.

4. The data acquisition system of claim 1 further comprising:
an enclosure housing the memory and processor; and
a second communication port coupled to the enclosure configured to communicate with a device remote from the enclosure.

5. The data acquisition system of claim 4, wherein the second communication port is configured to transfer information at least one of optical communication, wireless communication, via a modem or via a land-line.

6. The data acquisition system of claim 5, wherein the first communication port is coupled to a network comprising the vessel navigation system includes at least one of a sounder, a chart plotter, a radar and a digital bearing indicator.

7. The data acquisition system of claim 1 further comprising:
instructions, when executed by the processor, causes the system to:
analyze data stored in the memory to determine areas or techniques to avoid to maximize harvest of a targeted species while avoiding by-catch.

8. The data acquisition system of claim 1, a remote device selectively in communication with the memory through the second communication port wherein the remote device is at least one of a PDA, laptop or computer.

9. The system of claim 7, wherein analyzing the data further comprises:
analyzing multi-variable effects to reduce by-catch.

10. The system of claim 9, wherein determining further comprises:
analyzing multi-variable effects to reduce by-catch.

11. A method for acquiring fishing data, comprising:
generating a signal in response to an event;
automatically storing date and vessel position in a memory disposed on board a vessel in response to the signal; and
associating the date and vessel position with by-catch information relating to the event.

12. The method of claim 11, wherein the step of generating the signal further comprising manually actuating a switch.

13. The method of claim 11 further comprising:
storing information from a vessel navigation system in the memory in response to the signal.

14. The method of claim 13, wherein the step of storing information further comprises storing at least one of water temperature, heading, speed and depth.

15. The method of claim 11 further comprising: manually entering information associated with the event.

16. The method of claim 11 further comprising:
transferring the stored information to a remote device.

17. The method of claim 16, wherein the step of transferring further comprises establishing optical, wireless or land-line communication between the remote device and the memory on board the vessel.

18. The method of claim 11 further comprising building a database of information associated with events; and
performing statistical analysis on the event information stored in the database.

19. The method of claim 18 further comprising identifying factors that increase harvest of a target species relative to the by-catch from information stored in the memory.

20. A method for acquiring fishing data, comprising:
storing vessel position, target species catch and by-catch information in a memory disposed on board a vessel to build a historical database; and
determining, from the historical database, areas or techniques that relate to harvest of a targeted species relative to by-catch.

* * * * *